United States Patent
Tamai

(12) United States Patent (10) Patent No.: US 11,020,700 B2
Tamai (45) Date of Patent: Jun. 1, 2021

(54) HONEYCOMB STRUCTURE BODY

(71) Applicant: DENSO CORPORATION, Kariya (JP)

(72) Inventor: Koji Tamai, Kariya (JP)

(73) Assignee: DENSO CORPORATION, Kariya (JP)

( * ) Notice: Subject to any disclaimer, the term of this patent is extended or adjusted under 35 U.S.C. 154(b) by 228 days.

(21) Appl. No.: 16/207,408

(22) Filed: Dec. 3, 2018

(65) Prior Publication Data

US 2019/0176077 A1 Jun. 13, 2019

(30) Foreign Application Priority Data

Dec. 7, 2017 (JP) ............................. JP2017-235418

(51) Int. Cl.
| | |
|---|---|
| B01D 46/24 | (2006.01) |
| B01J 35/04 | (2006.01) |
| B01D 46/00 | (2006.01) |
| B01D 53/94 | (2006.01) |

(52) U.S. Cl.
CPC ..... *B01D 46/2455* (2013.01); *B01D 46/0063* (2013.01); *B01D 46/247* (2013.01); *B01D 46/2474* (2013.01); *B01D 53/94* (2013.01); *B01J 35/04* (2013.01); *B01D 2046/2496* (2013.01); *B01D 2255/102* (2013.01); *B01D 2255/2065* (2013.01)

(58) Field of Classification Search
None
See application file for complete search history.

(56) References Cited

U.S. PATENT DOCUMENTS

| | | | |
|---|---|---|---|
| 2007/0231533 A1 | 10/2007 | Aniolek et al. | |
| 2013/0136663 A1* | 5/2013 | Bubb | B01J 35/04 422/177 |
| 2015/0275726 A1* | 10/2015 | Tamai | B01D 46/247 428/116 |
| 2017/0080412 A1 | 3/2017 | Murata | |

FOREIGN PATENT DOCUMENTS

| | | |
|---|---|---|
| JP | 2014-046601 | 3/2014 |
| JP | 2014-180606 | 9/2014 |

* cited by examiner

*Primary Examiner* — David Sample
*Assistant Examiner* — Elizabeth Collister
(74) *Attorney, Agent, or Firm* — Nixon & Vanderhye P.C.

(57) ABSTRACT

A honeycomb structure body has cell walls, inner cells and outer cells, and a boundary partition wall. The inner cells are arranged in a high cell density area and the outer cells are arranged in a low cell density area. A cell density of the high cell density area is higher than a cell density of the low cell density area. Cell reinforced parts are formed at a first intersection part at which the cell walls intersect each other. Boundary reinforced parts are formed at a second intersection part at which the cell walls and the boundary partition wall intersect each other. The honeycomb structure body satisfies a relationship of Sb>Sc, where Sb indicates an average value of a cross sectional area of the overall boundary reinforced parts, and Si indicates an average value of a cross sectional area of the overall inner cell reinforced parts.

13 Claims, 9 Drawing Sheets

HONEYCOMB STRUCTURE BODY

CROSS-REFERENCE TO RELATED APPLICATION

This application is related to and claims priority from Japanese Patent Application No. 2017-235418 filed on Dec. 7, 2017, the contents of which are hereby incorporated by reference.

BACKGROUND OF THE INVENTION

1. Field of the Invention

The present invention relates to honeycomb structure bodies composed of different cell density areas and boundary partition walls with which the different cell density areas are from separated each other.

2. Description of the Related Art

Honeycomb structure bodies are known and used as a catalyst support so as to purify exhaust gas resulting from combustion of fuels and emitted from an internal combustion engine. Such a honeycomb structure body has cell walls and a plurality of cells. Each of cells has a channel shape through which exhaust gas flows. The cell walls are arranged in a lattice shape in a cross section of the honeycomb structure body, which is perpendicular to a longitudinal direction of the honeycomb structure body. Each of the plurality of cells is surrounded by the cell walls.

Such a honeycomb structure body is mounted on an exhaust gas pipe connected to the internal combustion engine. A temperature of the cell walls increases due to a high temperature exhaust gas when the high temperature exhaust gas is flowing in the cells of the honeycomb structure body. When catalyst supported on the cell walls are activated by the high temperature cell walls, the catalyst removes harmful components from the exhaust gas so as to purify the exhaust gas.

Recently, a honeycomb structure body having a newly-improved structure has been studies and developed, in which cell density areas having a different cell density to each other are arranged, and adjacent cell density areas are separated by a boundary cell part. For example, a honeycomb structure body has a central cell density area and an outer peripheral cell density area having a different cell density, and the central cell density area is separated from the outer peripheral cell density area by the boundary partition wall.

Patent document 1, Japanese patent laid open publication No. 2017-60902 has disclosed a honeycomb structure body having a structure in which reinforced parts are formed at specific intersection parts of cells around a boundary cell wall. This structure of the honeycomb structure body suppresses a pressure loss from reducing, and increases a strength of the honeycomb structure body against applied outside force without increasing of a total weight of the honeycomb structure body.

However, the conventional structure of the honeycomb structure body disclosed in the patent document 1 previously described has a first specific area and a second specific area. In the first specific area, no reinforced part is formed at the specific intersection between the boundary partition wall and adjacent cell walls. In the second specific area, an reinforced part having an insufficient thickness is formed. This reduces a rigidity at a specific intersection part formed adjacent to the boundary partition wall in the first specific area and the second specific area when compared with a rigidity at an intersection part between adjacent cell walls, which is formed away from the boundary partition wall, i.e not connected to the boundary partition wall.

When thermal stress is generated in the honeycomb structure body having the conventional structure previously described due to a rapid temperature variation, there occurs a possible case in which the generated thermal stress is concentrated into the specific intersection part having a low rigidity in the first specific area and the second specific area.

In general, emission control is performed so as to prevent a catalyst temperature from increasing more than a specific temperature while considering a heat-resistance capability of the catalyst because exhaust gas flows in an exhaust gas pipe in which a flow speed of the exhaust gas at a central part is higher than that at an outer peripheral part thereof.

However, the honeycomb structure body with such a catalyst is used at a high temperature due to continuous technical development improving heat-resistance capability of the honeycomb structure body. This causes rapid variation of the inside temperature of the honeycomb structure body, and large thermal stress is generated in the honeycomb structure body. Accordingly, it is desirable for the honeycomb structure body to have further-improved heat-resistance capability.

SUMMARY

It is therefore desired to provide a honeycomb structure body containing boundary partition walls and having a superior heat resistance capability.

An exemplary embodiment provides a honeycomb structure body having an outer skin part, cell walls, cells, a boundary partition wall, cell reinforced parts and boundary reinforced parts. The outer skin part has a cylindrical shape. The cell walls partition an inside area of the outer skin part into the cells. The cells are surrounded by the cell walls and formed extending along an axial direction of the honeycomb structure body. The boundary partition wall of a cylindrical shape is formed along the axial direction of the honeycomb structure body, by which the cells are divided into inner cells and outer cells. The inner cells are arranged in a high cell density area. The outer cells are arranged in a low cell density area. The high cell density area has a cell density which is higher than a cell density of the low cell density area. The high cell density area contains a central axis of the honeycomb structure body. The low cell density area is separated from the high cell density area by the boundary partition wall when viewed in a cross sectional area of the honeycomb structure body which is perpendicular to the axial direction of the honeycomb structure body. In the honeycomb structure body having the structure previously described, cell reinforced parts are formed at a first intersection part at which the cell walls intersect each other. Boundary reinforced parts are formed at a second intersection part at which the cell walls and the boundary partition wall intersect each other. In particular, a relationship of Sb>Sc is satisfied, where Sb indicates an average value of a cross sectional area of overall boundary reinforced parts, and Sc indicates an average value of a cross sectional area of the overall cell reinforced parts in a cross section which is perpendicular to the axial direction of the honeycomb structure body.

The honeycomb structure body having the structure previously described satisfies the relationship of Sb>Sc. That is, the average value Sb of a cross sectional area of overall boundary reinforced parts formed at the second intersection part is greater than the average value Sc of a cross sectional area of the overall cell reinforced parts formed at the second intersection part, when viewed in a cross section which is perpendicular to the axial direction of the honeycomb structure body. This improved structure makes it possible for the boundary partition wall to have rigidity which is higher than rigidity of the cell walls which are not adjacent to the boundary partition wall. Accordingly, this structure makes it possible to suppress thermal stress from being concentrated to the boundary partition wall, and to move thermal stress from the boundary partition wall to the cell walls which are not arranged adjacent to the boundary partition wall.

Accordingly, it is possible for the honeycomb structure body having the improved structure to suppress defects from being generated near the boundary partition wall even if a rapid temperature variation occurs in the honeycomb structure body. The present invention provides the honeycomb structure body having the boundary partition wall with superior heat-resistance capability.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
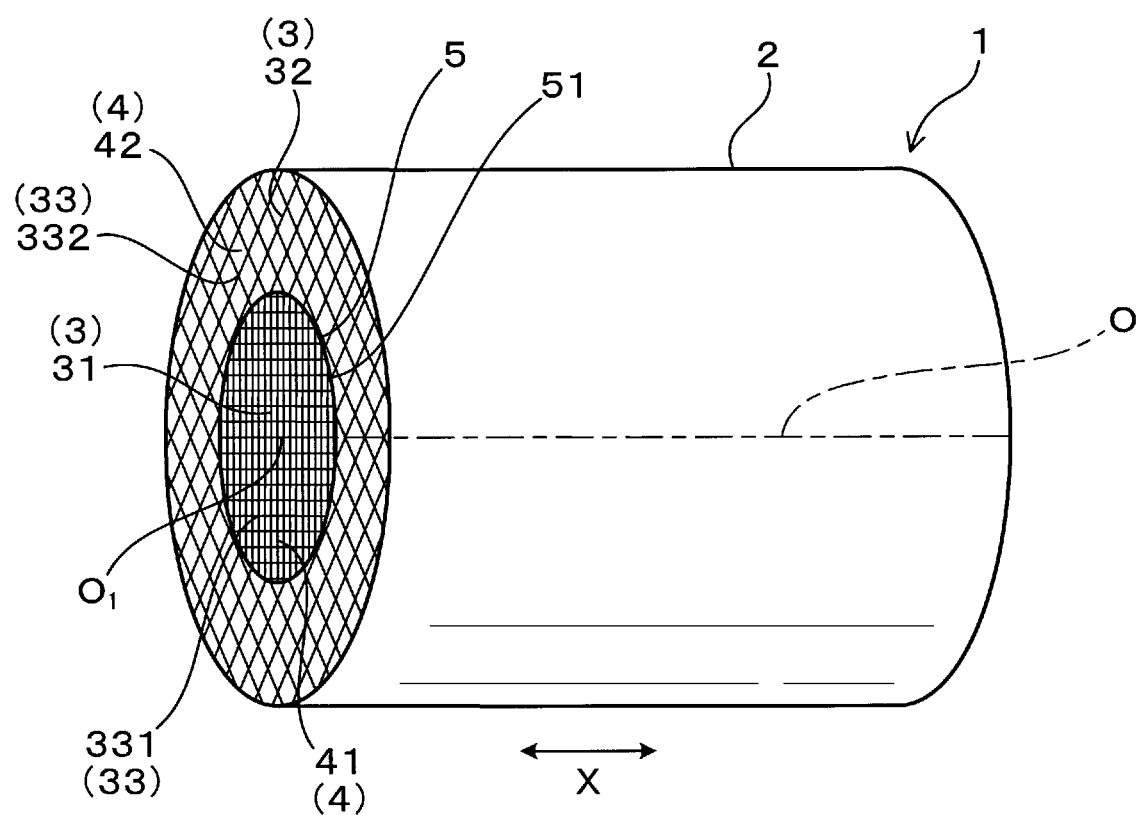
FIG. 1 is a perspective view showing a honeycomb structure body according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a honeycomb structure body according to a first exemplary embodiment with reference to FIG. 1 to FIG. 5.

Figure 2:
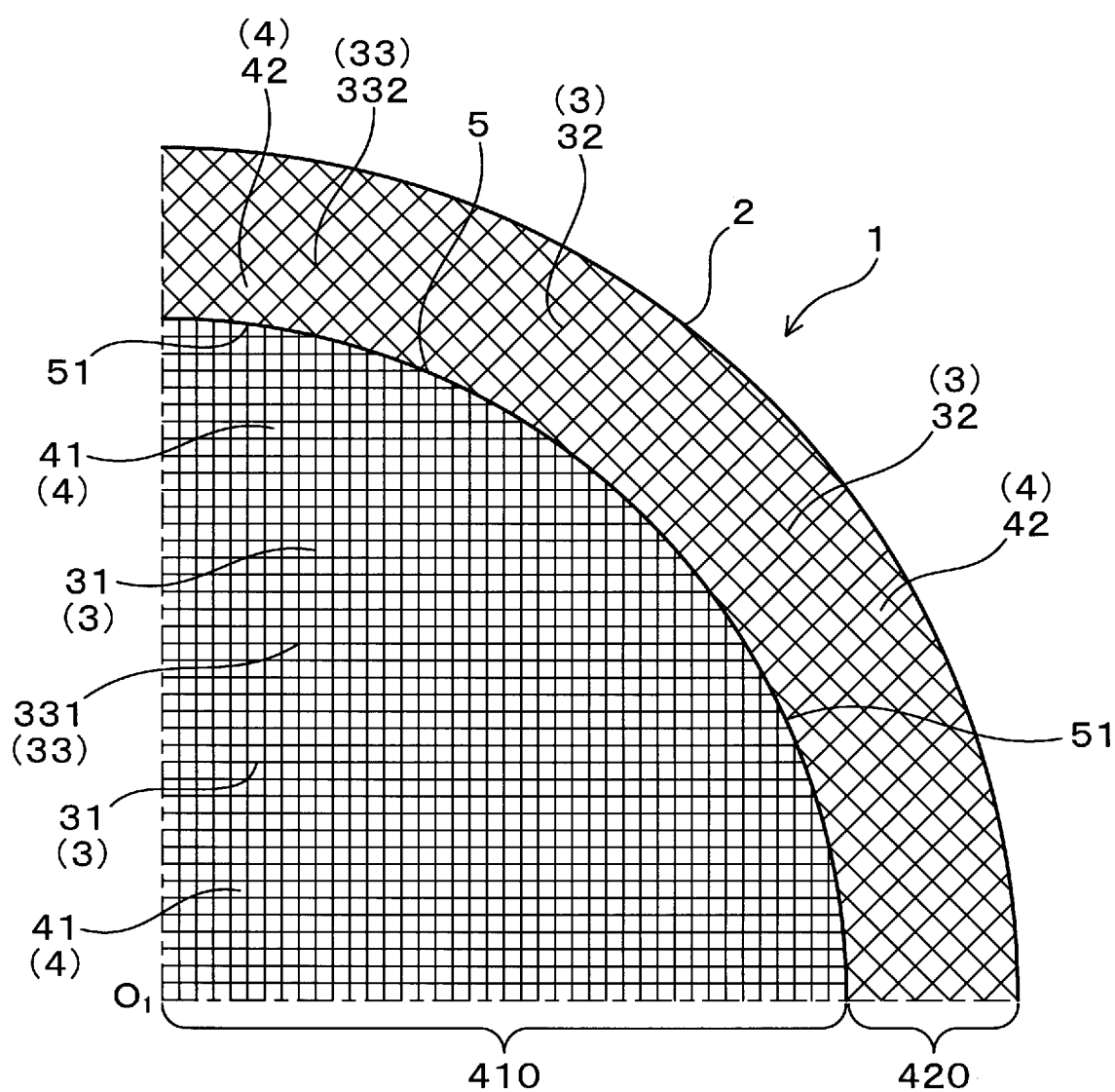
FIG. 2 is a view showing an enlarged cross section of the honeycomb structure body shown in FIG. 1 according to the first exemplary embodiment of the present invention.
Figure 3:
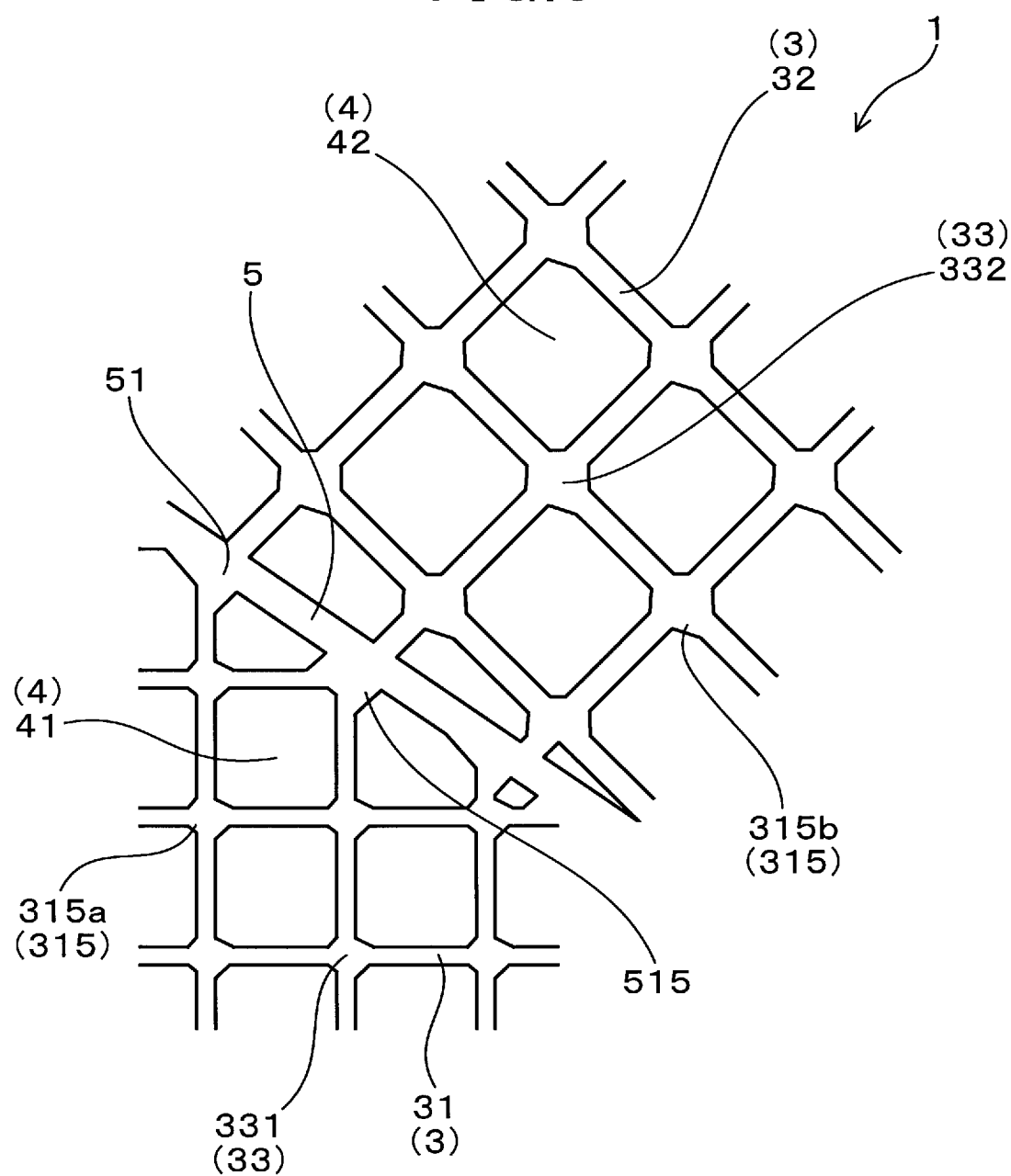
FIG. 3 is a view showing an enlarged cross section of an area around a boundary partition wall 5 in the honeycomb structure body according to the first exemplary embodiment of the present invention.

FIG. 1 is a perspective view showing the honeycomb structure body 1 according to a first exemplary embodiment of the present invention. FIG. 2 is a view showing an enlarged cross section of the honeycomb structure body 1 shown in FIG. 1. FIG. 3 is a view showing an enlarged cross section of an area around a boundary partition wall 5 in the honeycomb structure body 1 according to the first exemplary embodiment shown in FIG. 1.

As shown in FIG. 1, FIG. 2 and FIG. 3, the honeycomb structure body 1 according to the first exemplary embodiment has an outer skin part 2, cell walls 3, cells 4, boundary partition walls 5, cell reinforced parts 315, and boundary reinforced parts 515. The honeycomb structure body 1 is made of porous ceramic and has a monolithic structure in which the outer skin part 2, the cell walls 3, the cells 4, the boundary partition walls 5, the cell reinforced parts 315 and the boundary reinforced parts 515 are formed in one body.

For example, the honeycomb structure body 1 according to the first exemplary embodiment is made of porous ceramic such as cordierite, silicon carbide (SiC), aluminum titanate, ceria-zirconia solid solution, alumina, mullite, etc. From the point of view of a low thermal expansion and superior heat-resistance capability, it is preferable to use cordierite so as to produce the honeycomb structure body 1.

The honeycomb structure body 1 according to the first exemplary embodiment is used as a catalyst support capable of supporting catalyst therein. For example, when exhaust gas emitted from an internal combustion engine passes through the honeycomb structure body 1, the catalyst supported in the honeycomb structure body 1 removes harmful components from the exhaust gas and the exhaust gas is purified.

As shown in FIG. 1 and FIG. 2, the outer skin part 2 has a cylindrical shape. It is possible for the outer skin part 2 to have another outline shape. For example, it is possible for the outer skin part 2 to have one of a cylindrical tube, a rectangular tube, a pentagonal tube, a hexagonal tube, an octagonal tube, etc. It is preferable for the outer skin part 2 to have a cylindrical tube. This cylindrical tube makes it possible to drastically disperse outside stress which is applied to the honeycomb structure body 1. For example, the structure of the cylindrical tube prevents the honeycomb structure body 1 from being broken in a canning step of the manufacturing process in which the honeycomb structure body 1 is assembled to a catalyst converter for automobiles.

In a cross section of the honeycomb structure body 1 according to the first exemplary embodiment, which is perpendicular to the longitudinal direction, i.e. the axial direction X (see FIG. 1) of the honeycomb structure body 1, the cells 4 are surrounded by the cell walls 3 (or partition walls). The cells 4 are arranged in a lattice pattern in a cross section of the honeycomb structure body 1. It is possible for the cells 4 to have another arrangement pattern in a cross section of the honeycomb structure body 1.

Figure 4:
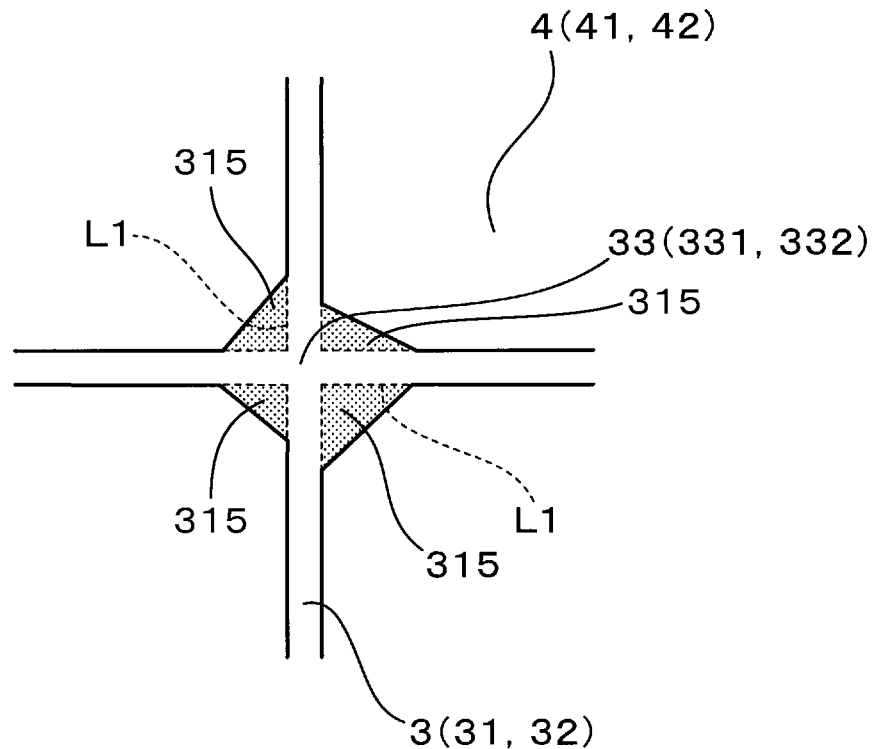
FIG. 4 is a view showing an enlarged cross section of a first intersection part at which cell walls intersect each other in the honeycomb structure body according to the first exemplary embodiment of the present invention.
Figure 5:
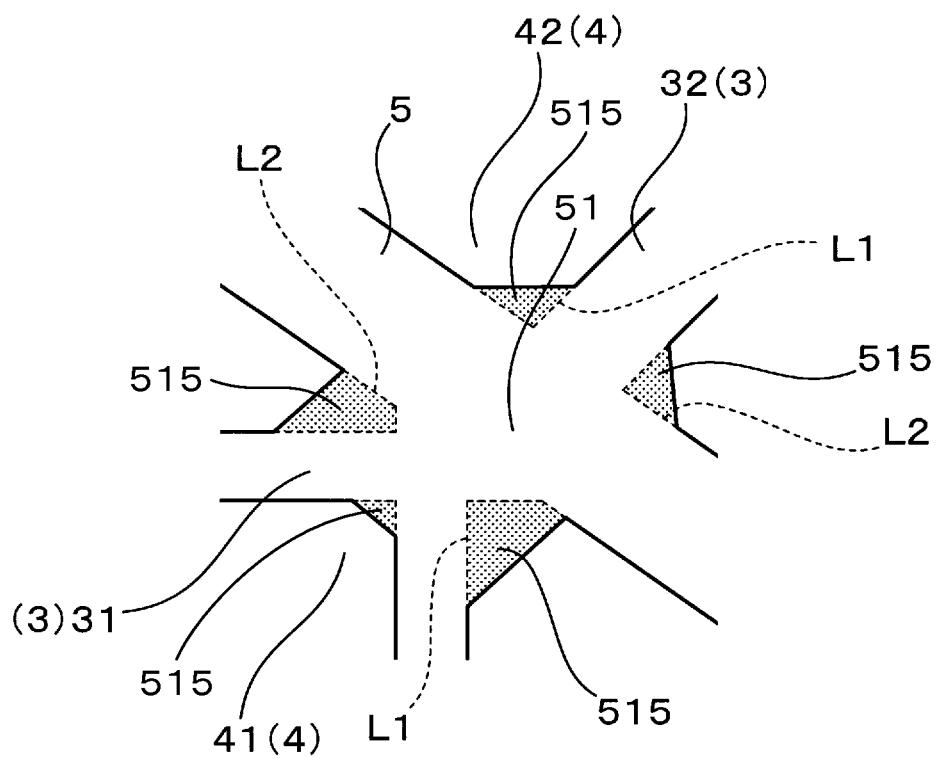
FIG. 5 is a view showing an enlarged cross section of a second intersection part at which the cell walls and the boundary partition wall intersect each other in the honeycomb structure body according to the first exemplary embodiment of the present invention.

FIG. 4 is a view showing an enlarged cross section of a first intersection part 33 at which the cell walls 3 intersect each other in the honeycomb structure body 1 according to the first exemplary embodiment. FIG. 5 is a view showing an enlarged cross section of a second intersection part 51 at which the cell walls 3 and the boundary partition wall 5 intersect each other in the honeycomb structure body 1 according to the first exemplary embodiment.

FIG. 1 to FIG. 5 show the cell walls 3 by which each of the cells 4 is formed in a quadrangular lattice pattern so that a cross section of each cell 4 has a polygon with four sides. It is acceptable to arrange the cell walls 3 in a polygonal lattice pattern such as a triangular lattice pattern, a hexagonal lattice pattern, an octagonal lattice pattern. From the viewpoint of a flow resistance of exhaust gas and a strength of the honeycomb structure body, it is preferable to arrange the cell walls 3 in a quadrangular lattice pattern or a hexagonal lattice pattern, and it is more preferable to arrange the cell walls 3 in a quadrangular lattice pattern.

Each of the cells 4 is surrounded by the cell walls 3, and extends along the axial direction X of the outer skin part 2, i.e. the axial direction X of the honeycomb structure body 1. The longitudinal direction of each of the cells 4 is in parallel with the axial direction X of the honeycomb structure body 1.

The axial direction X of the outer skin part 2 of a cylindrical shape coincides with the axial direction X of the honeycomb structure body 1 having a cylindrical shape. It is acceptable for each of the cells 4 to have any shape in a cross section which is perpendicular to the axial direction X, of the honeycomb structure body 1. It is possible for each of the cells 4 to have a rectangular shape, a pentagonal shape, a hexagonal shape, an octagonal shape, etc.

The honeycomb structure body 1 according to the first exemplary embodiment has the cells 4 which are formed in two difference cell density areas.

As shown in FIG. 2, the honeycomb structure body 1 has a high cell density area 410 and a low cell density area 420. The high cell density area 410 is formed in a central area around the central axis O of the outer skin part 2 in the honeycomb structure body 1. The cells 4 formed in the high cell density area 410 will be referred to as inner cells 41.

The low cell density area 420 is formed in an outer peripheral area outside of the high cell density area 410 in the honeycomb structure body 1. The cells 4 are arranged in the low cell density area 420 having a cell density which is lower than the cell density of the high cell density area 410. The cells 4 formed in the low cell density area 420 will be referred to as outer cells 42.

As shown in FIG. 1, FIG. 2 and FIG. 3, it is possible for each of the high cell density area 410 and the low cell density area 420 to have a constant cell density, respectively. On the other hand, it is possible for each of the high cell density area 410 and the low cell density area 420 to have a changeable cell density which is gradually changed therein.

It is possible to change the cell density in each of the high cell density area 410 and the low cell density area 420 so that the cell density is gradually reduced from the central point O1 to the outer skin part 2 in a cross section which is perpendicular to the axial direction X of the honeycomb structure body 1. In this structure, each of the high cell density area 410 and the low cell density area 420 has an average cell density therein. From the view point of maintaining the necessary strength of the honeycomb structure body 1, it is preferable for each of the high cell density area 410 and the low cell density area 420 to have a constant cell density therein, as shown in FIG. 1, FIG. 2 and FIG. 3.

FIG. 2 shows a quarter in a cross section of the honeycomb structure body 1, in which the central axis O extends from the central point O1 toward an orthogonal direction to a paper of FIG. 2.

As shown in FIG. 1, FIG. 2 and FIG. 3, the cell walls 3 are composed of inner cell walls 31 and outer cell walls 32. It is possible to form the inner cell walls 31 forming the inner cell 41 and to form the outer cell walls 32 forming the outer cell 42 so that the outer cell walls 32 are inclined to the inner cell walls 31 by approximately 45 degrees (45°) in a cross section which is perpendicular to the axial direction X of the honeycomb structure body 1, for example. It is acceptable to form the inner cell walls 31 and the outer cell walls 32 so that the outer cell walls 32 are inclined at a desired angle to the inner cell walls 31 according to purposes.

The high cell density area 410 is separated from the low cell density area 420 by the boundary partition wall 5. The boundary partition wall 5 has a cylindrical shape. However, the concept of the present invention is not limited by the shape of the boundary partition wall 5. It is acceptable for the boundary partition wall 5 to have a shape of one of a cylindrical tube, a rectangular tube, a pentagonal tube, a hexagonal tube, an octagonal tube, etc. It is preferable for the boundary partition wall 5 to have the shape of a cylindrical tube. This structure of the cylindrical tube shape of the boundary partition wall 5 makes it possible to prevent the honeycomb structure body 1 from being broken in a canning step of the manufacturing process.

The cell reinforced part 315 is formed at the first intersection part 33 at which the adjacent cell walls 3 intersect each other. This reinforced part 315 between the adjacent cell walls 3 will be referred to the cell reinforced part 315. It is not necessary to form the cell reinforced part 315 at all of the first intersection parts 33 at which the cell walls 3 intersect each other. In other words, it is possible to form the intersection part 33 at which no cell reinforced part 315 is formed. However, it is preferable to form the cell reinforced part 315 at all of the first intersection parts 33 between the cell walls 3. This preferable structure makes it possible to drastically increase heat-resistance capability and the strength of the honeycomb structure body.

Further, the boundary reinforced part 515 is also formed at the second intersection part 51 at which the adjacent cell walls 3 and the boundary partition wall 51 intersect each other. This boundary reinforced part 515 between the adjacent cell walls 3 and the boundary partition wall 5 will be referred to the boundary reinforced part 515. Similar to the first intersection parts 33 at which the cell walls 3 intersect each other, it is not necessary to form the boundary reinforced parts 515 at all of the second intersection parts 51 at which the cell walls 3 and the boundary partition wall 5 intersect each other. In other words, it is possible to form the intersection part without the boundary reinforced part 515. It is preferable to form the boundary reinforced part 515 at all of the second intersection parts 51 between the cell walls 3 and the boundary partition wall 5. This preferable structure makes it possible to drastically increase heat-resistance capability and the strength of the honeycomb structure body.

Further, although the boundary reinforced part 515 is formed at the second intersection part 51 between the cell walls 3 and the boundary partition wall 5, it is acceptable to form the boundary reinforced part 515 which extends to an inner intersection part 331 between the adjacent inner cell walls 31, and extends to an outer intersection part 332 between the adjacent outer cell walls 32 due to an increased thickness of the second intersection part 51.

FIG. 4 shows the first intersection part 33 with the four cell reinforced parts 315 having a wide and thick part at which the adjacent cell walls 3 are connected together. FIG. 5 shows the second intersection part 51 with the five boundary reinforced parts 515 having a wide and thicker part at which the adjacent cell walls 3 and the boundary partition wall 5 are connected together. Because each of the cell reinforced part 315 and the boundary reinforced part 515 has a wide and thick part, this makes it possible to increase heat-resistance capability and the strength of the honeycomb structure body when compared with those of a honeycomb structure body without the cell reinforced part 315 and the boundary reinforced part 515.

Each of gray areas shown in FIG. 4 corresponds to the cell reinforced part 315. The cell reinforced part 315 is formed at a corner of each of the four cells 4 arranged in a lattice shaped arrangement at the first intersection part 33. The cell reinforced part 315 projects from the extended line L1 of each cell wall 3 toward the outside of the first intersection part 33. The cell reinforced part 315 corresponds to the area formed at the outside of the outline of each cell wall 3 having a line shape.

Similar to the cell reinforced part 315, each of gray areas shown in FIG. 5 corresponds to the boundary reinforced part 515. The boundary reinforced part 515 is formed at a corner of each of the cells 4 connected to the second intersection part 51 including the boundary partition wall 5. The boundary reinforced part 515 projects from the extended line L1 of each cell wall 3 and the extended line L2 of the boundary partition wall 5 toward the outside of the second intersection part 51. The boundary reinforced part 515 corresponds to the area formed at the outside of the border line of each cell wall 3 and the outline of the boundary partition wall 5 having a line shape.

The extended line L1 of the cell wall 3 is a virtual line extended along the outline of the cell wall 3. Similar to the extended line L1, the extended line L2 of the boundary partition wall 5 is a virtual line extended along the outline of the boundary partition wall 5.

As shown in FIG. 3, FIG. 4 and FIG. 5, the honeycomb structure body 1 according to the first exemplary embodiment satisfies the relationship of Sb>Sc, where Sb indicates an average value of a cross sectional area of the overall boundary reinforced parts 515, and Sc indicates an average value of a cross sectional area of the overall cell reinforced parts 315 in a cross section which is perpendicular to the axial direction X of the honeycomb structure body 1.

When Sb≤Sc, the rigidity of the second intersection part 51 becomes lower than the rigidity of the first intersection part 33, where only the cell walls 3 intersect each other at the first intersection part 33, and both the cell walls 3 and the boundary partition wall 5 intersect each other at the second intersection part 51. As a result, this structure makes it possible to cause a drawback in which a honeycomb structure body is broken due to concentration of thermal stress at the area around the boundary partition wall 5 having a weak rigidity by a rapid temperature change.

It is acceptable to measure a cross sectional area of each of the boundary reinforced parts 515 and the cell reinforced parts 315 on an end surface of the honeycomb structure body in the axial direction X thereof because the shape of a cross section, which is perpendicular to the axial direction X of the honeycomb structure body is substantially equal to the shape of the end surface of the honeycomb structure body. In general, the measurement of the area of the cell reinforced parts 315 and the boundary reinforced parts 515 is performed by using an image measurement device. Specifically, images of the end surface and/or the cross section of the honeycomb structure body are picked up, and the area of each of the cell reinforced parts 315 and the boundary reinforced parts 515 on the picked-up images are measured.

As shown in FIG. 3, the cell reinforced part 315 has an inner cell reinforced part 315a and an outer cell reinforced part 315b. The inner cell reinforced parts 315a are formed at the inner intersection part 331 at which the inner cell walls 31 forming the inner cells 41 intersect each other and are arranged in the high cell density area 410. The outer cell reinforced parts 315b are formed at the outer intersection part 332 at which the outer cell walls 42 forming the outer cells 42 intersect each other and are arranged in the low cell density area 420.

In the structure of the honeycomb structure body 1 according to the first exemplary embodiment, it is preferable to satisfy the relationship of Sb>So≥Si, where Sb indicates an average value of a cross sectional area of the overall boundary reinforced parts 515, So indicates an average value of a cross sectional area of the overall outer cell reinforced parts 315b, and Si indicates an average value of a cross sectional area of the overall inner cell reinforced parts 315a in a cross section which is perpendicular to the axial direction X of the honeycomb structure body 1.

The structure of the honeycomb structure body 1 previously described satisfies the relationship of (a)>(b)>(c), where (a) indicates a rigidity of the second intersection part 51 at which the cell walls 3 (the inner cell walls 31 or the outer cell walls 32) and the boundary partition wall 5 intersect each other, (b) indicates a rigidity of the outer intersection part 332 at which the outer cell walls 32 forming the outer cells 42 intersect each other, and (c) indicates a rigidity of the inner intersection part 331 at which the inner cell walls 31 forming the inner cells 41 intersect each other.

As a result, thermal stress is easily concentrated at the inner cell walls 31 forming the inner cells 41 having a low rigidity. However, in the structure of the honeycomb structure body 1 according to the first exemplary embodiment, because the inner cells 41 are formed in the high cell density area 410 having a high cell density, it is possible for the inner cells 41 to have durability to thermal stress.

Because thermal stress is more concentrated to the inner cell walls 31 forming the inner cells 41 having a superior heat-resistance capability, it is possible to prevent the honeycomb structure body 1 from being broken and cracks from being generated in honeycomb structure body 1.

It is more preferable for the honeycomb structure body 1 to have a structure which satisfies the relationship of Sb>So>Si from the viewpoint of more improving heat-resistance capability.

On the other hand, when excessively increasing the thickness of the cell reinforced parts 315 so as to enhance the rigidity, a heat capacity of the honeycomb structure body 1 increases. This structure prevents a temperature of the honeycomb structure body 1 from being easily increased, and reduces the purification performance of the honeycomb structure body 1 to purify exhaust gas. That is, this structure deteriorates an emission control. From the viewpoint of improving the emission control, it is preferable for the outer cell reinforced part 315b to satisfy the relationship of So≤0.015 mm², more preferable to satisfy the relationship of So≤0.01 mm², and most preferable to satisfy the relationship of So≤0.008 mm².

Further, it is preferable for the inner cell reinforced part 315a to satisfy the relationship of Si≤0.01 mm², more preferable to satisfy the relationship of Si≤0.008 mm², and most preferable to satisfy the relationship of Si≤0.004 mm².

When the cross sectional area of the boundary reinforced part 515 increases, a catalyst slurry is easily clogged in the cells 4 surrounded by the boundary reinforced part 515 and the cell walls 3 arranged adjacent to this boundary partition wall 515 during a supporting step of supporting catalyst in the honeycomb structure body 1. This increases a total amount of catalyst which is not used by exhaust gas purification. In order to avoid this drawback, it is preferable for the boundary reinforced part 515 to satisfy the relationship of Sb≤0.02 mm², more preferable to satisfy the relationship of Sb≤0.015 mm², further preferable to satisfy the relationship of Sb≤0.01 mm², and most preferable to satisfy the relationship of Sb≤0.008 mm².

The present invention does not limit the shape of each of the cell reinforced part 315 and the boundary reinforced part 515. As shown in FIG. 3, FIG. 4 and FIG. 5, it is possible for each of the cell reinforced part 315 and the boundary reinforced part 515 to have a polygonal shape such as a triangle shape, a rectangular shape, a pentagonal shape, etc. or a cutout shape (or a chamfer shape) in a cross section which is perpendicular to the axial axis X of the honeycomb structure body 1.

It is possible to adjust a cross sectional area of each of the cell reinforced part 315 and the boundary reinforced part 515 having a cutout shape or a polygonal shape previously described by adjusting a slope length and angle thereof in a direction which is perpendicular to the axial direction X of the honeycomb structure body 1.

As will be explained in a second exemplary embodiment, it is possible for each of the cell reinforced part 315 and the boundary reinforced part 515 to have an inner recessed and curved surface shape (i.e. an inwardly curved surface shape), or for the cell reinforced part 315 and the boundary reinforced part 515 to have a combination of a rectangular shape (or a chamfer shape) and an inner recessed and curved surface shape, (or an inwardly curved surface shape).

FIG. 4 shows a structure in which the cell reinforced parts 315 formed at the first intersection part 33 have a different shape. However, it is acceptable for the cell reinforced parts 315 formed in each of the high cell density area 410 and the low cell density area 420 to have a same shape. This makes it possible to easy produce a metal die to be used in the manufacture of the honeycomb structure body 1. This further makes it possible to suppress the cells from being deformed during an extrusion molding step in the manufacture of the honeycomb structure body 1 because of suppressing a feeding speed of raw material soil during the extrusion molding step.

Further, it is possible for the inner cell reinforced part 315a formed in the high cell density area 410 and the outer cell reinforced part 315b formed in the low cell density area 420 to have a different shape. Still further, it is acceptable for the cell reinforced parts 315 (i.e. the inner cell reinforced parts 315a) formed in the high cell density area 410 to have a different shape, and for the cell reinforced parts 315 (i.e. the outer cell reinforced parts 315b) formed in the low cell density area 420 to have a different shape.

It is preferable for each of the cell reinforced part 315 and the boundary reinforced part 515 to have at least one of a rectangular shape (or a chamfer shape) and an inner recessed and curved surface shape (hereinafter, referred to as the "inwardly curved surface shape"). This structure makes it possible to relax thermal stress from being concentrated to the first intersection part 33 and the second intersection part 51, and for the honeycomb structure body 1 according to the first exemplary embodiment to have the improved heat resistance capability.

It is preferable for the honeycomb structure body 1 according to the first exemplary embodiment to have a relationship of Tb≥To≥Ti, where Ti represents a thickness of the inner cell wall 31 forming the inner cell 41, To represents a thickness of the outer cell wall 32 forming the outer cells 42, and Tb represents a thickness of the boundary partition wall 5. This structure of the honeycomb structure body 1 makes it possible to increase exhaust gas purification capability of purifying exhaust gas. In order to further enhance exhaust gas purification capability, it is more preferable for the honeycomb structure body 1 to have a relationship of Tb>To>Ti.

It is possible to adjust the thickness of each of the inner cell wall 31 and the outer cell wall 32 within a range of 40 μm to 160 μm, for example. It is possible to adjust the thickness of the boundary partition wall 5 within a range of 30 μm to 1000 μm.

The strength of the honeycomb structure body 1 is reduced due to the reduction of the thickness of each of the inner cell wall 31, the outer cell wall 32 and the boundary partition wall 5.

On the other hand, there is a possible problem in which the emission control is reduced when the thickness of each of the inner cell wall 31, the outer cell wall 32 and the boundary partition wall 5 is reduced.

It is preferable for the honeycomb structure body 1 according to the first exemplary embodiment to satisfy the relationship of Do/Di which is within a range of 0.85 to 0.43, where Di represents a cell density of the inner cells 41, Do represents a cell density of the outer cells 42. This structure makes it possible to provide an optimum gas flow of exhaust gas flowing in the honeycomb structure body 1. That is, it is possible to provide the honeycomb structure body 1 having the high purification capability of purifying exhaust gas and a low pressure loss. For example, it is possible to adjust the cell density Do of the outer cells 42 within a range of 30 cells/cm² to 150 cells/cm².

The cell density is defined as the number of cells 4 per unit area cm². Specifically, when the unit area cm² is an area surrounded by a central line of each of the cell walls 3 which form the cell 4, it is possible to calculate the number of the cells 4 in the unit area. The calculated number of the cells 4 represents the cell density.

It is acceptable to form the honeycomb structure body 1 according to the first exemplary embodiment as a monolithic body. It is also acceptable to connect a plurality of segments so as to form the honeycomb structure body 1 according to the first exemplary embodiment. It is preferable to produce the honeycomb structure body 1 according to the first exemplary embodiment as a monolithic body. This structure makes it possible to avoid a plurality of connection parts by which the segments are connected to form the honeycomb structure body 1, and possible to reduce the pressure loss of the honeycomb structure body 1.

For example, it is possible to apply the honeycomb structure body 1 according to the first exemplary embodiment to a catalyst converter with catalyst capable of purifying exhaust gas. In this application, the catalyst is supported on the surfaces of the cell walls 3, etc. of the honeycomb structure body 1 according to the first exemplary embodiment so as to remove particulate matter, i.e. harmful components contained in exhaust gas. The exhaust gas emitted from an internal combustion engine is thereby purified by the catalyst converter. It is possible for the honeycomb structure body 1 according to the first exemplary embodiment to have a porosity within a range of 10 to 70%. Further, it is possible for the honeycomb structure body 1 according to the first exemplary embodiment to have an average pore size (pore diameter) of not less than 2 μm.

It is possible to use one or more noble metal such as platinum (Pt), palladium (Pd), or rhodium (Rh) as catalyst to be supported in the honeycomb structure body 1 according to the first exemplary embodiment. Such catalyst is supported on the surfaces of the cell walls 3 having a porous structure in the honeycomb structure body 1 according to the first exemplary embodiment. Further, catalyst, ceria as a co-catalyst or a promotor, alumina are supported together by the cell walls 3.

There is a method of supporting catalyst by the cell walls 3. For example, a green molded body having a honeycomb structure is immersed into a slurry containing catalyst, and the green molded body with the slurry is heated to produce the honeycomb structure body 1. This method makes it possible to support the catalyst in the honeycomb structure body 1.

A description will now be given of a production of the honeycomb structure body 1 made of cordierite according to the first exemplary embodiment. It is acceptable to use another material instead of using such cordierite so as to produce the honeycomb structure body 1.

First, kaolin, fused silica (or molten silica), aluminum hydroxide, alumina, talc, carbon particle, etc. are mixed together so as to prepare raw material powder. The raw material powder as cordierite has a chemical composition of $SiO_2$ within a range of 45 to 55%, $Al_2O_3$ within a range of 33 to 42%, and MgO within a range of 12 to 18%. Water, binder, etc. are added to the raw material power having the chemical composition of cordierite so as to produce ceramic raw material.

The produced ceramic raw material is extruded and molded to produce a green molded body having a honeycomb structure by using a metal die of an extrusion and molding. The extrusion and molding die has slits which correspond to the arrangement pattern of the cell walls 3 in the honeycomb structure body 1.

The green molded body is dried to produce a honeycomb molded body by using a microwave dryer. The honeycomb molded body is cut into a plurality of cut bodies by a specific length. The cut bodies are fired at a high temperature within a range of 1390 to 1430° C. to produce the honeycomb structure body 1 according to the first exemplary embodiment shown in FIG. 1, FIG. 2 and FIG. 3.

It is possible to use a metal die (not shown) having a slit structure which corresponds to the arrangement of the cell walls 3 in the honeycomb structure body 1. For example, it is possible to form the slit structure of the metal die by using an electric discharge machine, a laser processing machine, or a slicing machine, etc. At this step, it is also possible to form slits in the metal die which correspond to the arrangement of the cell reinforced parts 315 and the boundary reinforced parts 515 by using the electric discharge machine, the laser processing machine, or the slicing machine, etc. It is also possible to form slits in the metal die which correspond to the arrangement of the cell reinforced parts 315 and the boundary reinforced parts 515 in the honeycomb structure body 1 by using a laser processing method, an electric discharging method, a fluid polishing method, etc.

As previously described, the honeycomb structure body 1 according to the first exemplary embodiment has the improved structure which satisfies the relationship of Sb>Sc, where Sb indicates an average value of a cross sectional area of the boundary reinforced parts 515 and Sc indicates an average value of a cross sectional area of the overall cell reinforced parts 315 in a cross section which is perpendicular to the axial direction X of the honeycomb structure body 1.

That is, the honeycomb structure body 1 according to the first exemplary embodiment has the improved structure in which the average value of the cross sectional area of the boundary reinforced parts 515 formed at the second intersection part 51 is greater than the average value of the cross sectional area of the cell reinforced parts 315 formed at the first intersection part 33. This improved structure makes it possible to provide the boundary partition wall 5 having the rigidity which is greater than the rigidity of the cell walls 3 which are not adjacent to the boundary partition wall 5. That is, the honeycomb structure body 1 according to the first exemplary embodiment has the improved structure which satisfies the relationship in which the rigidity of the boundary reinforced parts 515 is greater than the rigidity of the cell reinforced parts 315 (i.e. the rigidity of the boundary reinforced parts 515>the rigidity of the cell reinforced parts 315).

This structure makes it possible to disperse stress from the boundary partition wall 5, and for the cell walls 3, which are not arranged adjacent to the boundary partition wall 5, having a relatively high strength to receive the stress. As a result, it is possible for the honeycomb structure body 1 according to the first exemplary embodiment to have the boundary partition wall 5 with a superior heat-resistance capability.

As previously described, the present invention provides the honeycomb structure body 1 according to the first exemplary embodiment having the boundary partition wall and the superior heat-resistance capability.

Second Exemplary Embodiment

A description will be given of the honeycomb structure body 1 according to a second exemplary embodiment with reference to FIG. 6, FIG. 7 and FIG. 8.

Figure 6:
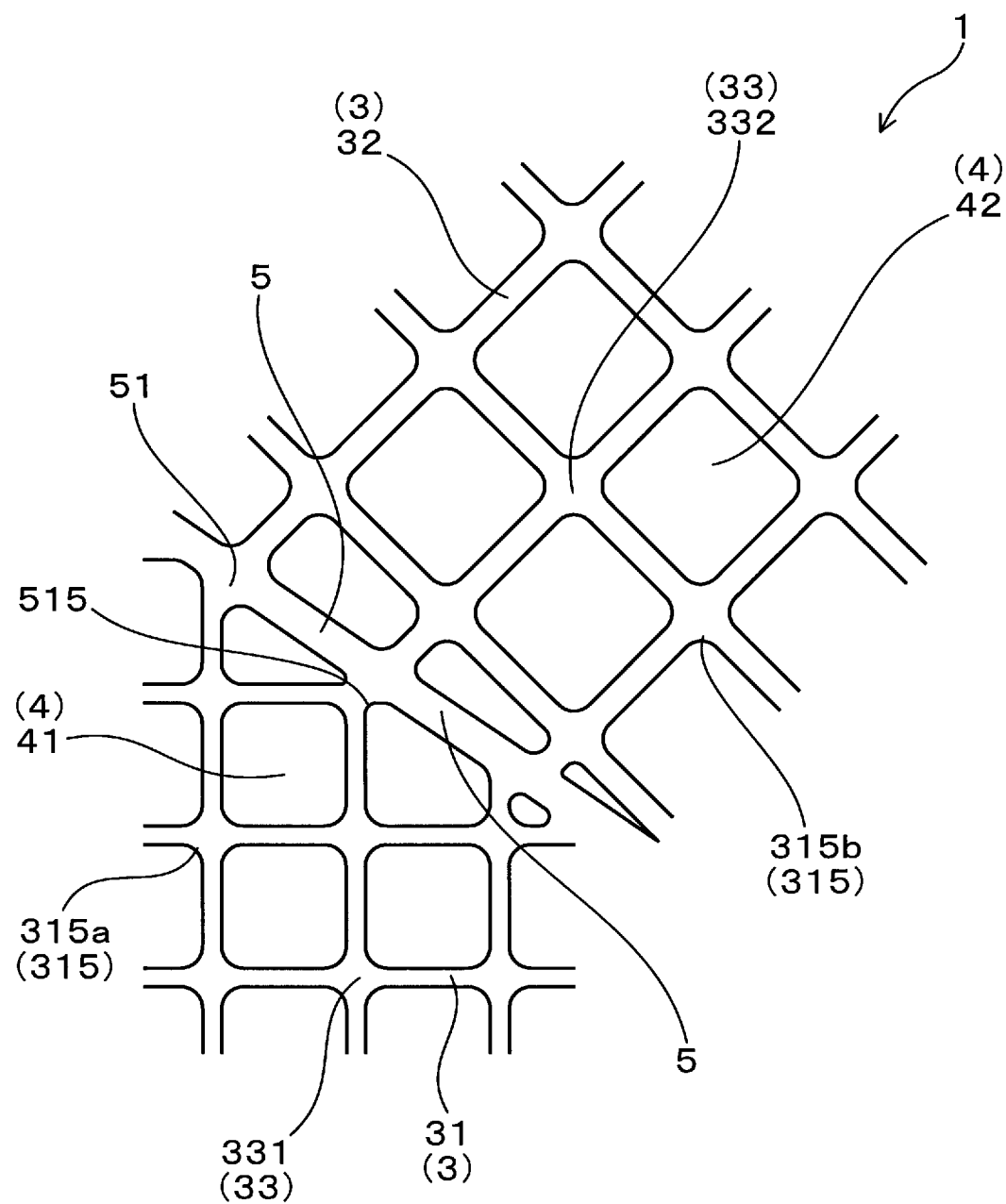
FIG. 6 is a view showing an enlarged cross section of an area around the boundary partition wall in the honeycomb structure body according to a second exemplary embodiment of the present invention.

FIG. 6 is a view showing an enlarged cross section of an area around the boundary partition wall 5 in the honeycomb structure body 1 according to the second exemplary embodiment of the present invention. FIG. 7 is a view showing an enlarged cross section of the first intersection part 33 at which the inner cell walls 31 intersect each other in the honeycomb structure body 1 according to the second exemplary embodiment. FIG. 8 is a view showing an enlarged cross section of the second intersection part 51 at which the inner cell walls 31 and the boundary partition wall 5 intersect each other in the honeycomb structure body 1 according to the second exemplary embodiment.

Figure 7:
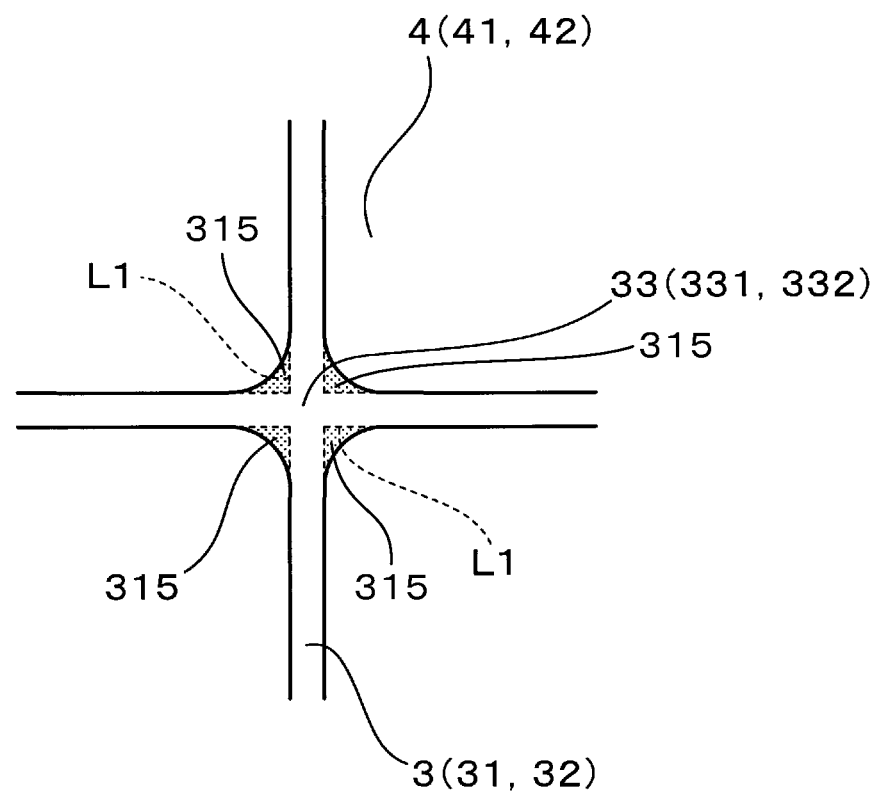
FIG. 7 is a view showing an enlarged cross section of the first intersection part at which cell walls intersect each other in the honeycomb structure body according to the second exemplary embodiment of the present invention.
Figure 8:
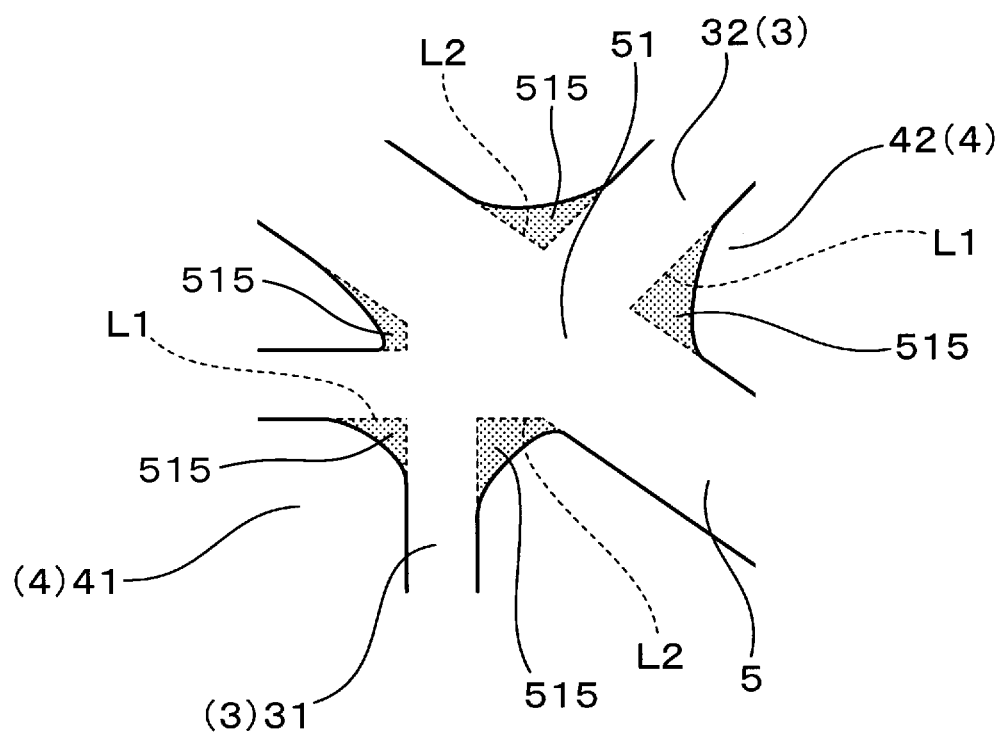
FIG. 8 is a view showing an enlarged cross section of the second intersection part at which the cell walls and the boundary partition wall intersect each other in the honeycomb structure body according to the second exemplary embodiment of the present invention.

As shown in FIG. 6, FIG. 7 and FIG. 8, a description will now be given of the honeycomb structure body 1 having the cell reinforced parts 315 and the boundary reinforced parts 515 in a cross section which is perpendicular to the axial direction X of the honeycomb structure body 1. In particular, each of the cell reinforced parts 315 and the boundary reinforced parts 515 has an inner recess and curved surface shape. The same components used in the first exemplary embodiment and the second exemplary embodiment will be referred with the same reference characters and numbers. The explanation of the same components is omitted here for brevity.

Similar to the structure of the honeycomb structure body 1 according to the second exemplary embodiment, the honeycomb structure body 1 according to the second exemplary embodiment has the cell reinforced parts 315 and the boundary reinforced parts 515.

Each of the cell reinforced parts 315 and the boundary reinforced parts 515 has an inner recessed and curved surface shape (hereinafter, referred to as the "inwardly curved surface shape") when viewed in a cross section which is perpendicular to the axial direction X of the honeycomb structure body 1. The inwardly curved surface shape has a radius of curvature.

When each of the cell reinforced part 315 and the boundary reinforced part 515 has the inwardly curved surface shape, a stress is relaxed at the intersection part of the cell reinforced part 315 and the cell walls 3 because the curved surface of the inwardly curved surface shape relaxes the stress. It is therefore possible for the honeycomb structure body 1 according to the second exemplary embodiment to have an increased heat-resistance capability. In other words, it is preferable for each of the cell reinforced parts 315 and the boundary reinforced parts 515, when viewed from the cross section which is perpendicular to the axial direction X, to have an inner recessed and curved surface shape or an inwardly curved surface shape.

Each of gray areas shown in FIG. 7 corresponds to the cell reinforced part 315. Each cell reinforced part 315 is formed at a corner of each of the four cells 4 arranged in a lattice shaped arrangement at the first intersection part 33.

Similar to the cell reinforced part 315 used in the first exemplary embodiment, the cell reinforced part 315 used in the second exemplary embodiment projects from the extended line L1 of each cell wall 3 toward the outside of the first intersection part 33. The cell reinforced part 315 corresponds to the area formed at the outside of the outline of each cell wall 3 having a line shape.

Similar to the cell reinforced part 315, each of gray areas shown in FIG. 8 corresponds to the boundary reinforced part 515. The boundary reinforced part 515 is formed at a corner of each of the cells 4 connected to the second intersection part 51 including the boundary partition wall 5. The boundary reinforced part 515 projects from the extended line L1 of each cell wall 3 and the extended line L2 of the boundary partition wall 5 toward the outside of the second intersection part 51. The boundary reinforced part 515 corresponds to the area formed at the outside of the border line of each cell wall 3 and the outline of the boundary partition wall 5 having a line shape. Other components of the honeycomb structure body 1 according to the second exemplary embodiment have the same structure as those of the honeycomb structure body 1 according to the first exemplary embodiment.

Even if each of the cell reinforced part 315 and the boundary reinforced part 515 has the inwardly curved surface shape, the honeycomb structure body 1 according to the second exemplary embodiment satisfies the relationship of Sb>Sc, where Sb indicates an average value of a cross sectional area of the overall boundary reinforced parts 515 and Sc indicates an average value of a cross sectional area of the overall cell reinforced parts 315 in a cross section which is perpendicular to the axial direction X of the honeycomb structure body 1. That is, this improved structure makes it possible to provide the boundary partition wall 5 having the rigidity which is greater than the rigidity of the cell walls 3 which are not adjacent to the boundary partition wall 5. That is, the honeycomb structure body 1 according to the second exemplary embodiment has the improved structure which satisfies the relationship in which the rigidity of the boundary reinforced parts 515 is greater than the rigidity of the cell reinforced parts 315 (i.e. the rigidity of the boundary reinforced parts 515>the rigidity of the cell reinforced parts 315).

This structure makes it possible to disperse the stress from the boundary partition wall 5, and for the cell walls 3 having a relatively high strength to receive the dispersed stress. As a result, it is possible for the honeycomb structure body 1 according to the second exemplary embodiment to have the boundary partition wall 5 with a superior heat-resistance capability.

It is possible to adjust the cross sectional area of each of the cell reinforced part 315 and the boundary reinforced part 515 by adjusting a length of a curved surface and the radius of curvature thereon in the direction which is perpendicular to the axial direction X. The honeycomb structure body 1 according to the second exemplary embodiment has the same effects as the honeycomb structure body 1 according to the first exemplary embodiment.

Third Exemplary Embodiment

A description will be given of the honeycomb structure body 1 according to a third exemplary embodiment with reference to FIG. 6 to FIG. 9.

Figure 9:
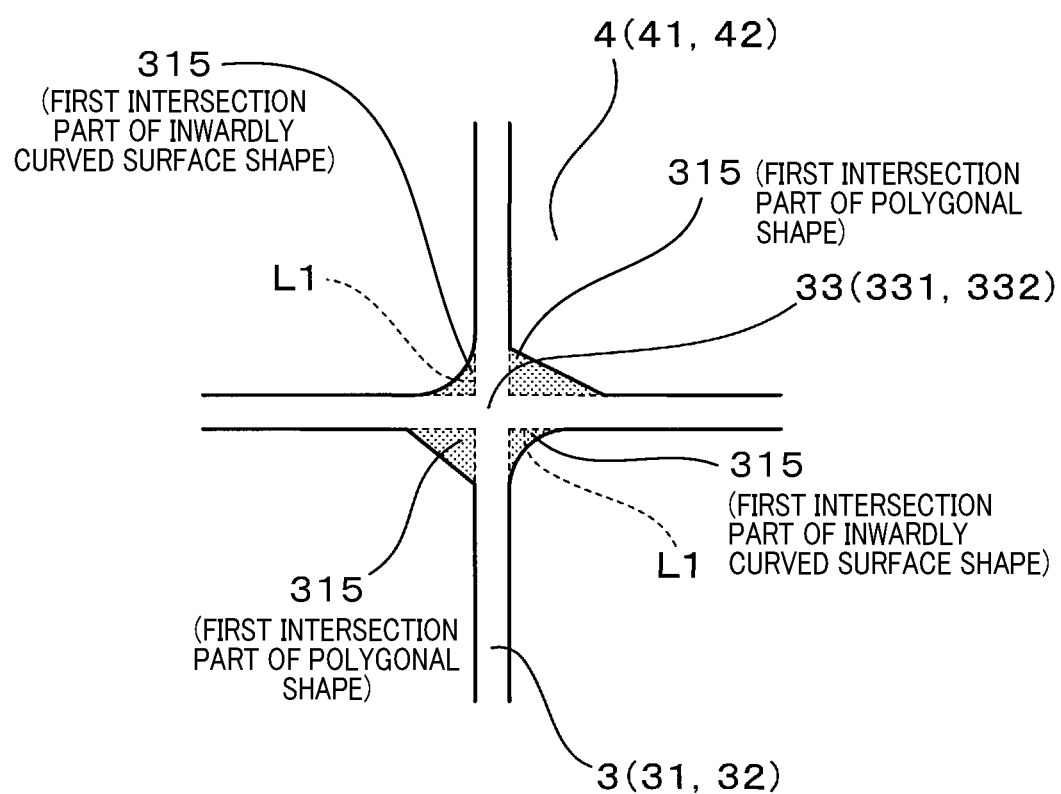
FIG. 9 is a view showing an enlarged cross section of the first intersection part at which cell walls intersect each other in the honeycomb structure body according to a third exemplary embodiment of the present invention.

FIG. 9 is a view showing an enlarged cross section of the first intersection part 315 at which the cell walls 33 intersect each other in the honeycomb structure body 1 according to the third exemplary embodiment of the present invention.

The honeycomb structure body 1 according to the third exemplary embodiment has a structure which is a combination of the structure of the first exemplary embodiment and the second exemplary embodiment. That is, the honeycomb structure body 1 according to the third exemplary embodiment has the first intersection parts 315 and the boundary reinforced parts 515 having a polygonal shape (see FIG. 4 and FIG. 5 according to the first exemplary embodiment) and the cell reinforced parts 315 and the boundary reinforced parts 515 having an inner recessed and curved surface shape, i.e. an inwardly curved surface shape (see FIG. 7 and FIG. 8 according to the second exemplary embodiment).

For example, FIG. 9 shows the first intersection parts 315 of an inner recessed and curved surface shape, i.e. an inwardly curved surface shape) and the first intersection parts 315 of a polygonal shape. Similar to the first intersection parts 315 shown in FIG. 9, the boundary reinforced parts 515 have an inner recessed and curved surface shape, i.e. an inwardly curved surface shape and a polygonal shape.

Other components of the honeycomb structure body 1 according to the third exemplary embodiment are the same structure as those of the honeycomb structure body 1 according to the first and second exemplary embodiments.

Similar to the honeycomb structure body 1 according to the first exemplary embodiment, it is possible for the honeycomb structure body 1 according to the third exemplary embodiment to satisfy the relationship of Sb>So, where Sb indicates an average value of a cross sectional area of the boundary reinforced parts 515 and So indicates an average value of a cross sectional area of the cell reinforced parts 315 in a cross section which is perpendicular to the axial direction X of the honeycomb structure body 1.

Further, the improved structure makes it possible to provide the boundary partition wall 5 having the rigidity which is greater than the rigidity of the cell walls 3 which are not adjacent to the boundary partition wall 5. That is, the honeycomb structure body 1 according to the third exemplary embodiment has the structure in which the rigidity of the boundary reinforced parts 515 is greater than the rigidity of the cell reinforced parts 315 (i.e. the rigidity of the boundary reinforced parts 515>the rigidity of the cell reinforced parts 315) so long as the honeycomb structure body 1 satisfies the relationship of Sb>Sc, where Sb indicates an average value of a cross sectional area of the overall boundary reinforced parts 515 and Sc indicates an average value of a cross sectional area of the overall cell reinforced parts 315.

This improved structure makes it possible to disperse the stress applied to the boundary partition wall 5, and for the cell walls 3 having a relatively high strength to receive the dispersed stress. As a result, it is possible for the honeycomb structure body 1 according to the third exemplary embodiment to have the boundary partition wall 5 with a superior heat-resistance capability. The honeycomb structure body 1 according to the third exemplary embodiment has the same effects as the honeycomb structure body 1 according to the first exemplary embodiment.

(First Modification)

Figure 10:
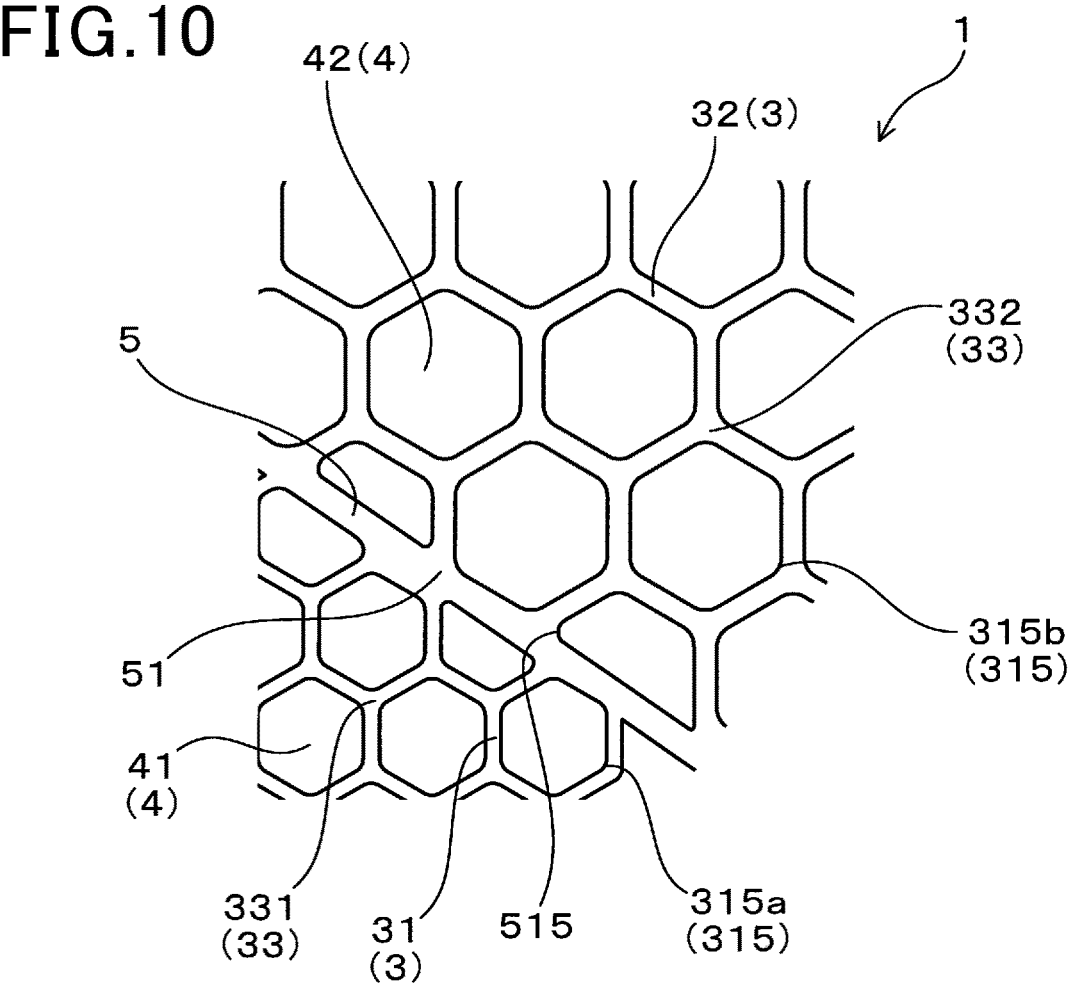
FIG. 10 is a view showing an enlarged cross section of a boundary area around the boundary partition wall in the honeycomb structure body according to a first modification of present invention.

FIG. 10 is a view showing an enlarged cross section of a boundary area around the boundary partition wall 5 in the honeycomb structure body 1 according to a first modification of the present invention. As shown in FIG. 10, the honeycomb structure body 1 according to the first modification has the cells 4. Each of the cells 4 has a regular hexagonal shape and is surrounded by the cell walls 3. That is, each of the cells 4 has a regular hexagonal shape in a cross section which is perpendicular to the axial direction X of the honeycomb structure body 1

Figure 11:
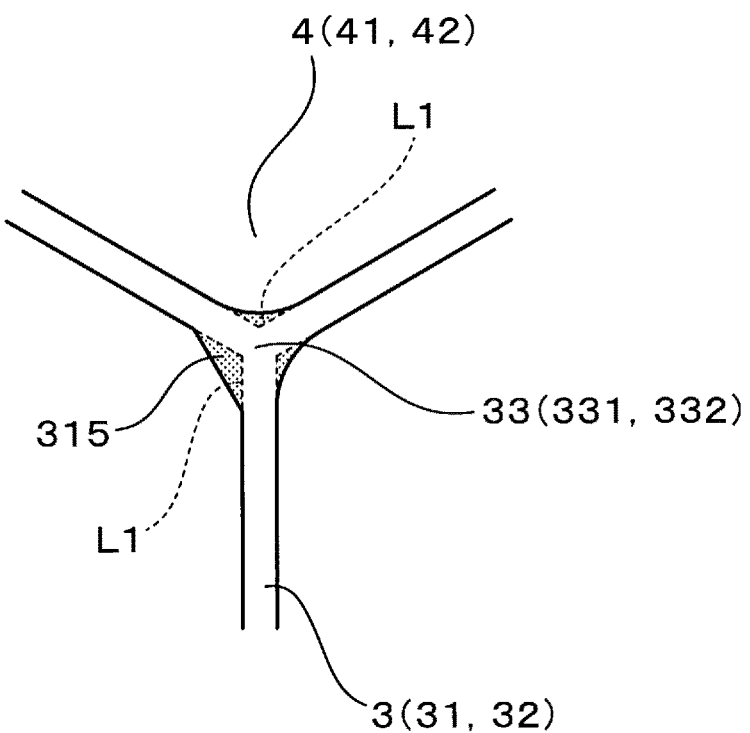
FIG. 11 is a view showing an enlarged cross section of the first intersection part at which the cell walls intersect each other in the honeycomb structure body according to the first modification of the present invention.
Figure 12:
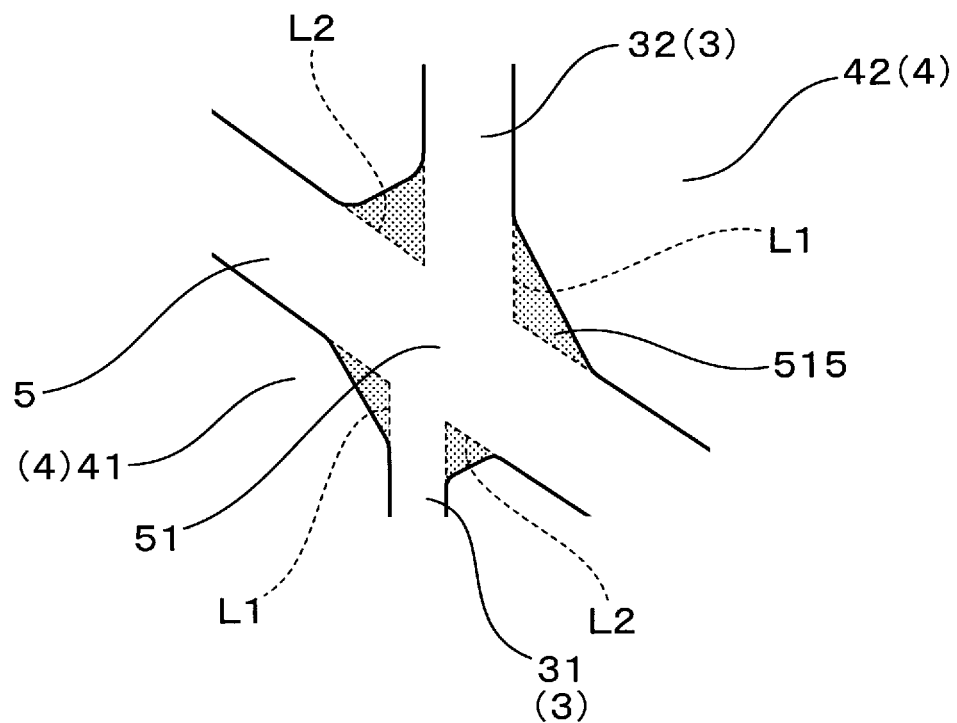
FIG. 12 is a view showing an enlarged cross section of the second intersection part at which the cell walls and the boundary partition wall intersect each other in the honeycomb structure body according to the first modification of the present invention.

FIG. 11 is a view showing an enlarged cross section of the first intersection part 33 at which the cell walls 3 intersect each other in the honeycomb structure body according to the first modification of the present invention. FIG. 12 is a view showing an enlarged cross section of the second intersection part 51 at which the cell walls 3 and the boundary partition wall 5 intersect each other in the honeycomb structure body according to the first modification of the present invention.

As shown in FIG. 10, FIG. 11 and FIG. 12, the cell reinforced parts 315 are formed at the first intersection part 33 at which the cell walls 3 intersect each other. Further, the boundary reinforced parts 515 are formed at the second intersection part 51 at which the cell walls 3 and the boundary partition wall 5 intersect each other.

Similar to the structure of the honeycomb structure body 1 according to the third exemplary embodiment, the cell reinforced parts 315 (see FIG. 9) and the boundary reinforced parts 515 have a combination of a polygonal shape (see FIG. 5) and an inner recessed and curved surface shape, i.e. an inwardly curved surface shape (see FIG. 8). For example, there are as the polygonal shape, a triangle shape, a square shape or a rectangular shape, a pentagonal shape, etc.

It is also possible for the cell reinforced parts 315 (see FIG. 9) and the boundary reinforced parts 515 to have a polygonal shape only. It is also possible for the cell reinforced parts 315 and the boundary reinforced parts 515 to have an inner recessed and curved surface shape, i.e. an inwardly curved surface shape only.

Other components of the honeycomb structure body 1 according to the first modification have the same structure as those of the honeycomb structure body 1 according to the first exemplary embodiment.

Similar to the structures of the honeycomb structure body 1 according to the first, second and third exemplary embodiments, it is possible for the honeycomb structure body according to the first modification with the cells 4 of a polygonal shape such as a hexagonal shape (see FIG. 10), instead of a rectangular shape, to have a superior heat-resistance capability so long as the cell reinforced part 315 and the boundary reinforced part 515 satisfy the relationship of Sb>Sc, where Sb indicates an average value of a cross sectional area of the overall boundary reinforced parts 515 and So indicates an average value of a cross sectional area of the overall cell reinforced parts 315 in a cross section which is perpendicular to the axial direction X of the honeycomb structure body 1.

(First Experiment)

A description will be given of experimental results of performance of honeycomb structure bodies according to test samples E1 to E3 and a reference example C2, and comparative examples C1 and C3. The reference example C2 is used as the standard sample for various evaluation tests.

The test samples E1 to E3 are honeycomb structure bodies according to the present invention. The comparative examples C1 and C3 are honeycomb structure bodies according to a prior art. That is, the test samples E1 to E3 have a different cross sectional area of the boundary reinforced parts 515, and a different cross sectional area of the cell reinforced parts 315. The comparative examples C1 and C3 according to a prior art and the reference example C2 have a different cross sectional area of the boundary reinforced parts 515, and a different cross sectional area of the cell reinforced parts 315.

Each of the test samples E1, E2 and E3 and the comparative samples C2 and C3 is a honeycomb structure body having the cell reinforced parts 315 and the boundary reinforced parts 515, each of which has a polygonal shape (for example, a triangle shape, a square shape or a rectangular shape, a pentagonal shape, etc.) in a cross section which is perpendicular to the axial direction X of the honeycomb structure body. The cell reinforced parts 315 are formed at the first intersection part 33 and the boundary reinforced parts 515 are formed at the second intersection part 51.

The cell reinforced parts 315 and the boundary reinforced parts 515 are not formed in the comparative sample C1. That is, the comparative sample C1 does not have any reinforced parts such as the cell reinforced parts 315 and the boundary reinforced parts 515 at the overall interaction parts. Catalyst is supported in each of the test samples E1, E2 and E3 and the reference example C2 and the comparative examples C1 and C3.

The honeycomb structure body as each of the test samples E1, E2 and E3, the reference example C2 and the comparative sample C3 has the structure which satisfies the relationship of Tb>To>Ti, where Ti represents a thickness of the inner cell wall 31 forming the inner cell 41, To represents a thickness of the outer cell wall 32 forming the outer cells 42, and Tb represents a thickness of the boundary partition wall 5. Each of the test samples E1, E2 and E3 and the reference example C2 and the comparative sample C3 has the high cell density area 410 having a constant cell density therein and the low cell density area 420 having a constant cell density therein. Specifically, the high cell density area 410 has a cell density of 93 cells/cm$_2$, and the low cell density area 420 has a cell density of 62 cells/cm$_2$.

Table 1 shows the experimental results regarding Sb, So, Si and Sc of each of the test samples E1, E2 and E3, the comparative samples C1 and C3, and the reference example C2, where Sb indicates an average value of a cross sectional area of the overall boundary reinforced parts 515, So indicates an average value of a cross sectional area of the overall outer cell reinforced parts 315b, Si indicates an average value of a cross sectional area of the overall inner cell reinforced parts 315a and Sc indicates an average value of a cross sectional area of the overall cell reinforced parts 315, which have been measured in a cross section which is perpendicular to the axial direction X of the honeycomb structure body.

Emission evaluation, heat-resistance capability and cell deformation of each of the test samples E1, E2 and E3, the comparative samples C1 and C3, and the reference example C2 were evaluated as follows.

(Evaluation of Emission)

The evaluation of emission indicates the evaluation of exhaust gas purification capability of each of the test samples E1, E2 and E3, the comparative samples C1 and C3, and the reference example C2.

Figure 13:
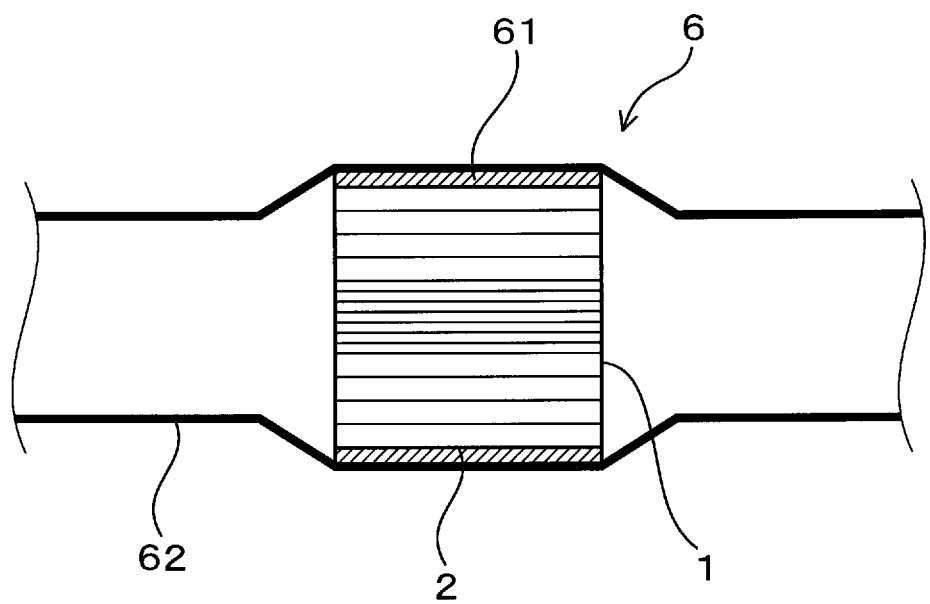
FIG. 13 is a view showing a cross section of a catalyst converter in which each of test samples and comparative samples is arranged.

FIG. 13 is a view showing a cross section of a catalyst converter in which the honeycomb structure body as each of the test samples E1, E2 and E3, the comparative samples C1 and C3, and the reference example C2 is arranged.

As shown in FIG. 13, the outer skin part 2 of a honeycomb structure body as each of the test samples E1, E2 and E3, the comparative samples C1 and C3, and the reference example C2 was wrapped in an alumina mat 61. After this, the honeycomb structure body as each of the test samples E1, E2 and E3, the comparative samples C1 and C3, and the reference example C2 wrapped in the alumina mat 61 was a catalyst converter 61. The catalyst converter 6 was placed in the inside of the exhaust gas pipe 62.

The honeycomb structure body as each of the test samples E1, E2 and E3, the comparative samples C1 and C3, and the reference example C2 has been mounted on an exhaust gas pipe connected to an internal combustion engine mounted on a motor vehicle. The honeycomb structure body as each of the test samples E1, E2 and E3, the comparative samples C1 and C3, and the reference example C2 was used once as the catalyst converter. Accordingly, catalyst supported in the honeycomb structure body has been deteriorated.

Next, the honeycomb structure body as each of the test samples E1, E2 and E3, the comparative samples C1 and C3, and the reference example C2 was placed in the exhaust gas pipe 62 of the motor vehicle. The driving test was performed under a specific driving mode such as LA # evaluation mode. Emission exhausted from the exhaust gas pipe 62 was measured. That is, a total amount of hydro carbon (HC) and nitrogen oxide (NOx) contained in emission exhausted from the internal combustion engine of the motor vehicle was measured.

In the experimental results of the evaluation of emission shown in Table 1, the evaluation value D is given to a sample having a total amount of hydrocarbon (HC) and nitrogen oxide (NOx) which has an increase of not less than 2% of a reference amount of the comparative sample C2 as the reference sample. The evaluation value C is given to a sample having a total amount of HC and NOx which has an increase of less than 2% and a reduction of less than 1% of the reference amount of the comparative sample C2. The evaluation value B is given to a sample having a total amount of HC and NOx which has a reduction within a range of not less than 1% and less than 2% of the reference amount of the comparative sample C2. Further, the evaluation value A is given to a sample having a total amount of HC and NOx which has a reduction of not less than 2% of the reference amount of the comparative sample C2.

(Evaluation of Heat-Resistance Capability)

Each of the test samples E1, E2 and E3, the comparative samples C1 and C3, and the reference example C2 was heated at a high temperature within a range of 900 to 1100° C. Atmospheric air was pumped through the cells 4 around the central point of the honeycomb structure body as each of the test samples E1, E2 and E3, the comparative samples C1 and C3, and the reference example C2 so as to generate a temperature difference within a range of 1 to 50° C./mm in honeycomb structure body as each of the test samples E1, E2 and E3, the comparative samples C1 and C3, and the reference example C2. The number of cracks generated in each sample was detected by visual observation.

In the experimental results of the evaluation of heat-resistance capability shown in Table 1, the evaluation D is given to a sample having a probability of cracking which has an increase of not less than 10% of a reference probability of cracking of the comparative sample C2 as the reference sample. The evaluation C is given to a sample having a probability of cracking which has an increase of less than 10% and a reduction of less than 5% of the reference probability of cracking of the comparative sample C2. The evaluation B is given to a sample having a probability of cracking which has a reduction within a range of not less than 5% and less than 10% of the reference probability of cracking of the comparative sample C2. The evaluation A is given to a sample having a probability of cracking which has the reduction of not less than 10% of the reference probability of cracking of the comparative sample C2.

(Evaluation of Cell Deformation)

The evaluation of cell deformation was performed as follows. A cross sectional surface of each of the test samples E1, E2 and E3, the comparative samples C1 and C3, and the reference example C2 was captured and a cell size on the captured cross sectional surface of each sample was detected on by using an image measuring device.

The occurrence of cell deformation was detected in each sample when the cell 4 has an angle having an increase of not less than 10° of a predetermined designed-cell angle. For example, the cell 4 is a hexagonal cell, the predetermined designed-cell angle becomes 120°. In the experimental results of the evaluation of cell deformation shown in Table 1, the evaluation D is given to a sample having the number of deformed cells which is an increase of not less than 10% of the number of deformed cells in the comparative sample C2 as the reference sample. The evaluation C is given to a sample having the number of deformed cells which is an increase of less than 10% and a reduction of less than 5% of the number of deformed cells in the comparative sample C2. The evaluation B is given to a sample having the number of deformed cells which is the reduction within a range of not less than 5% and less than 10% of the number of deformed cells in the comparative sample C2. The evaluation A is given to a sample having the number of deformed cells which is the reduction of not less than 10% of the number of deformed cells in the comparative sample C2.

TABLE 1

| | Sample No. | C1 | C2 | C3 | E1 | E2 | E3 |
|---|---|---|---|---|---|---|---|
| Specification | Shape of reinforced part | None | Polygonal | Polygonal | Polygonal | Polygonal | Polygonal |
| | Sb (mm$^2$) | — | 0.008 | 0.001 | 0.008 | 0.008 | 0.008 |
| | So (mm$^2$) | — | 0.008 | 0.008 | 0.001 | 0.001 | 0.004 |
| | Si (mm$^2$) | — | 0.008 | 0.008 | 0.004 | 0.001 | 0.001 |
| | Sc (mm$^2$) | — | 0.008 | 0.008 | 0.003 | 0.001 | 0.002 |
| Experimental results | Emission | A | Standard | C | B | A | A |
| | Heat-resistance capability | D | Standard | D | C | B | A |
| | Cell deformation | D | Standard | C | C | C | C |

As can be understood from the experimental results shown in Table 1, each of the test samples E1, E2 and E3 satisfying the relationship of Sb>Sc has a superior heat-resistance capability which is greater than that of the comparative sample C2 as the reference sample. Because each of the test samples E1, E2 and E3 has the structure in which the rigidity of the boundary reinforced part 515 is greater than the rigidity of the cell reinforced part 3, the stress is dispersed from the boundary partition wall 5 and the cell walls 3 having a relatively high strength can receive the dispersed stress.

As can be understood from the experimental results shown in Table 1, it is preferable for the honeycomb structure body to satisfy the relationship of Sb>So≥Si, where Sb indicates an average value of a cross sectional area of the overall boundary reinforced parts 515, So indicates an average value of a cross sectional area of the overall outer cell reinforced parts 315b, and Si indicates an average value of a cross sectional area of the overall inner cell reinforced parts 315a in a cross section which is perpendicular to the axial direction X of the honeycomb structure body as each sample.

This structure makes it possible to increase heat-resistance capability and improve exhaust gas purification capability, and to improve the emission control of the honeycomb structure body.

From the point of view of increasing of heat-resistance capability, it is preferable for the honeycomb structure body to satisfy the relationship of Sb>So>Si. This structure makes it possible for the cell walls formed in the high cell density area to receive thermal stress.

The structure having the specific relationship previously described makes it possible to provide the honeycomb structure body having an improved heat-resistance capability.

(Second Experiment)

A description will be given of experimental results of performance of honeycomb structure bodies according to test samples E4 and E5, a comparative sample C4, and the reference example C2.

The test samples E4 and E5 are honeycomb structure bodies according to the present invention. The comparative example C4 is a honeycomb structure body according to a known technology. As previously described, the reference example C2 is used as the standard sample for various evaluation tests.

As previously described, each of the cell reinforced parts 315 and the boundary reinforced parts 515 formed in the reference sample C2 has a polygonal shape.

On the other hand, the test samples E4 and E5 have a different cross sectional area of the boundary reinforced parts 515 and a different cross sectional area of the cell reinforced parts 315. The comparative example C4 according to the prior art have a different cross sectional area of the boundary reinforced parts 515 and a different cross sectional area of the cell reinforced parts 315. In the test samples E4 and E5 and the comparative example C4, each of the cell reinforced parts 315 and the boundary reinforced parts 515 has an inner recessed and curved surface shape, i.e. an inwardly curved surface shape (which corresponds to the curved surface in Table 2) when viewed from a cross sectional surface which is perpendicular to the axial direction X of each sample.

Catalyst is supported in each of the test samples E4 and E5 and the reference example C2 and the comparative example C4.

Table 2 shows the experimental results regarding Sb, So, Si and Sc of each of the test samples E4 and E5, the comparative sample C4, and the reference example C2, where Sb indicates an average value of a cross sectional area of the overall boundary reinforced parts 515, So indicates an average value of a cross sectional area of the overall outer cell reinforced parts 315b, Si indicates an average value of a cross sectional area of the overall inner cell reinforced parts 315a and Sc indicates an average value of a cross sectional area of the overall cell reinforced parts 315, which have been measured in a cross section which is perpendicular to the axial direction X of the honeycomb structure body.

Emission evaluation, heat-resistance capability and cell deformation of each of the test samples E4 and E5, the comparative sample C4, and the reference example C2 were detected as follows.

TABLE 2

| | | Sample No. | | | |
|---|---|---|---|---|---|
| | | C2 | C4 | E4 | E5 |
| Specification | Shape of reinforced part | Polygonal | Curved surface*) | Curved surface*) | Curved surface*) |
| | Sb (mm$^2$) | 0.008 | 0.008 | 0.008 | 0.020 |
| | So (mm$^2$) | 0.008 | 0.008 | 0.004 | 0.015 |
| | Si (mm$^2$) | 0.008 | 0.008 | 0.001 | 0.008 |
| | Sc (mm$^2$) | 0.008 | 0.008 | 0.002 | 0.011 |
| Experimental results | Emission | Standard | C | A | C |
| | Heat-resistance capability | Standard | C | A | A |
| | Cell deformation | Standard | A | B | A |

*)Curved surface indicates inwardly curved surface shape.

As can be understood from the experimental results in Table 2, the use of the cell reinforced parts 315 and the boundary reinforced parts 515 having an inner recessed and curved surface shape, i.e. an inwardly curved surface shape makes it possible to suppress cell deformation from occurring in the honeycomb structure body. Further, it can be understood from the experimental results shown in Table 2, the test samples E4 and E5 which satisfy the relationship of Sb>Sc and the relationship of Sb>So>Si increase their heat-resistance capability when compared with that of the comparative example C4, like the first experimental results shown in Table 1.

Furthermore, as can be understood from the experimental results in Table 2, it is preferable for the honeycomb structure body to satisfy the relationship of Sb>So≥Si, where Sb indicates an average value of a cross sectional area of the overall boundary reinforced parts 515, So indicates an average value of a cross sectional area of the overall outer cell reinforced parts 315*b*, and Si indicates an average value of a cross sectional area of the overall inner cell reinforced parts 315*a* in a cross section which is perpendicular to the axial direction X of the honeycomb structure body as each sample. This structure makes it possible to more increase heat-resistance capability and exhaust gas purification capability of the honeycomb structure body. Accordingly, this structure makes it possible to improve the emission control of the honeycomb structure body.

From the viewpoint of increasing heat-resistance capability, it is more preferable for the honeycomb structure body to satisfy the relationship of Sb>So>Si.

When the honeycomb structure body, like the test sample E5, has an increased cross sectional area of the cell reinforced parts 315 and the boundary reinforced parts 515, a heat capacity of the honeycomb structure body increases and deteriorates its emission. Accordingly, it is preferable the relationship of Sb≤0.08 and So≤0.4 in order to improve the emission control.

It is accordingly possible to increase heat-resistance capability of the honeycomb structure body when satisfying the relationships previously described.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structure body comprising:
    an outer skin part of a cylindrical shape;
    cell walls partitioning an inside area of the outer skin part into a plurality of cells, the plurality of cells being surrounded by the cell walls and being formed extending along an axial direction of the honeycomb structure body; and
    a boundary partition wall of a cylindrical shape, formed along the axial direction of the honeycomb structure body, by which the plurality of cells are divided into inner cells and outer cells, the inner cells being arranged in a high cell density area and the outer cells being arranged in a low cell density area, the high cell density area having a cell density higher than a cell density of the low cell density area, the high cell density area containing a central axis of the honeycomb structure body, the low cell density area being separated from the high cell density area by the boundary partition wall when viewed in a cross sectional area of the honeycomb structure body perpendicular to the axial direction of the honeycomb structure body, wherein
    cell reinforced parts are formed at a first intersection part at which the cell walls intersect each other, and boundary reinforced parts are formed at a second intersection part at which the cell walls and the boundary partition wall intersect each other,
    a relationship of Sb>Sc is satisfied, where Sb indicates an average value of a cross sectional area of the overall boundary reinforced parts, and Sc indicates an average value of a cross sectional area of the overall cell reinforced parts in a cross section which is perpendicular to the axial direction X of the honeycomb structure body;
    the cell reinforced parts outwardly extend from the first intersection part, at which the cell walls intersect each other, to a perimeter of the cell reinforced parts, and connect between the cell walls outside of the first intersection part to reinforce the first intersection part; and
    the boundary reinforced parts outwardly extend from the second intersection part, at which the cell wall and the boundary partition wall intersect each other, to a perimeter of the boundary reinforced parts and connect between the cell walls connect between the boundary partition walls and between the cell wall and the boundary partition wall outside of the second intersection part to reinforce the second intersection part.

2. The honeycomb structure body according to claim 1, wherein the cell reinforced parts have inner cell reinforced parts and outer cell reinforced parts,
    the inner cell reinforced parts are formed at the inner intersection part at which the inner cell walls forming the inner cells intersect each other and are arranged in the high cell density area,
    the outer cell reinforced parts are formed at the outer intersection part at which the outer cell walls forming the outer cells intersect each other and are arranged in the low cell density area,
    wherein the honeycomb structure body satisfies a relationship of Sb>So≥Si, where Sb indicates the average value of the cross sectional area of the overall boundary reinforced parts, So indicates an average value of a cross sectional area of the overall outer cell reinforced parts, and Si indicates an average value of a cross sectional area of the overall inner cell reinforced parts in a cross section which is perpendicular to the axial direction of the honeycomb structure body.

3. The honeycomb structure body according to claim 2, wherein further satisfies a relationship of Sb>So>Si.

4. The honeycomb structure body according to claim 3, wherein the inner cell reinforced parts are formed at the overall inner intersection parts, and the outer cell reinforced parts are formed at the overall outer intersection parts.

5. The honeycomb structure body according to claim 2, wherein the inner cell reinforced parts are formed at the overall inner intersection parts, and the outer cell reinforced parts are formed at the overall outer intersection parts.

6. The honeycomb structure body according to claim 1, wherein each of the cell reinforced parts and the boundary reinforced parts has at least one of a polygonal shape and an inwardly curved surface shape in a cross section which is perpendicular to the axial direction of the honeycomb structure body.

7. The honeycomb structure body according to claim 2, wherein each of the cell reinforced parts and the boundary reinforced parts has at least one of a polygonal shape and an inwardly curved surface shape in a cross section which is perpendicular to the axial direction of the honeycomb structure body.

8. The honeycomb structure body according to claim 1, wherein each of the overall cell reinforced parts and the overall boundary reinforced parts has an inwardly curved surface shape in a cross section which is perpendicular to the axial direction of the honeycomb structure body.

9. The honeycomb structure body according to claim 2, wherein each of the overall cell reinforced parts and the overall boundary reinforced parts has an inwardly curved surface shape in a cross section which is perpendicular to the axial direction of the honeycomb structure body.

10. The honeycomb structure body according to claim 1, further satisfying a relationship of $Tb \geq To \geq Ti$, where $Ti$ represents a thickness of the inner cell walls forming the inner cell, To represents a thickness of the outer cell walls forming the outer cells, and Tb represents a thickness of the boundary partition wall.

11. The honeycomb structure body according to claim 2, further satisfying a relationship of $Tb \geq To \geq Ti$, where $Ti$ represents a thickness of the inner cell walls forming the inner cell, To represents a thickness of the outer cell walls forming the outer cells, and Tb represents a thickness of the boundary partition wall.

12. The honeycomb structure body according to claim 1, further satisfying a relationship of Do/Di within a range of 0.85 to 0.43, where Di represents a cell density of the inner cells arranged in the high cell density area, Do represents a cell density of the outer cells arranged in the low cell density area.

13. The honeycomb structure body according to claim 2, further satisfying a relationship of Do/Di within a range of 0.85 to 0.43, where Di represents a cell density of the inner cells arranged in the high cell density area, Do represents a cell density of the outer cells arranged in the low cell density area.

* * * * *